Sept. 4, 1945.   P. S. CARDOZO   2,384,280
EDUCATIONAL TOY
Filed Aug. 8, 1944
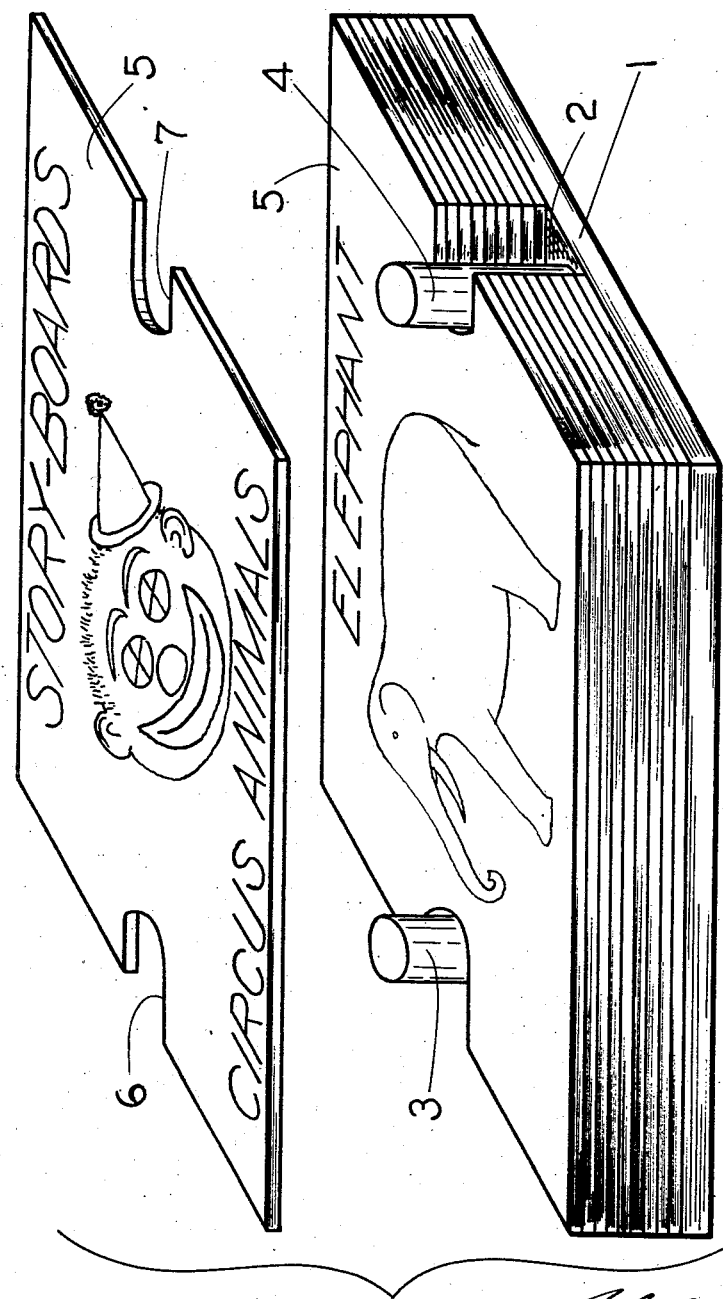
Inventor
Peter S. Cardozo Patented Sept. 4, 1945

2,384,280

UNITED STATES PATENT OFFICE 2,384,280

EDUCATIONAL TOY

Peter S. Cardozo, Washington, D. C.

Application August 8, 1944, Serial No. 548,552

3 Claims. (Cl. 35—29)

This invention relates to children's toys and more particularly to the structure of a pictorial story-book designed to develop a child's coordination in the use thereof.

Children between the ages of one and four years have comparatively little physical strength and their mental development is such that their power of coordination between thought and act is limited in scope. This coordination is best developed by an exercise of their faculties with simple educational toys the operation of which is within the reason of the child.

In view of the limited ability of youngsters to coordinate thought and act, the primary objection to picture books heretofore used has been in their lack of structural appeal to children. That is to say, the picture books of conventional design are of a complexity which puts them beyond the understanding of the child and the educational value of such books, therefore, resides in the subject matter thereof. However, books of a size sufficient to portray the subject matter in a manner to seize and focus a child's attention thereon are awkward to hold and handle, resulting in the tearing of pages and the destruction of the binding. Such pages are damaged by moisture from saliva and wet fingers. Moreover, as a small child often becomes fascinated by one picture and as no means are provided for the removal of individual pages, the child will tear the page out of the book in order to retain possession of the figure thereon. Admonishment by the child's parents against destruction of this kind develops complexes in the child and curtails the beneficial results which should be expected from the use and perusal of the picture book.

It is the object of this invention to provide an educational toy for the very young whose primary purpose is to develop a child's power of coordination provided with ancillary features of interest to encourage the use of the toy.

It is a further object of this invention to provide a loose leaf picture book operable by the very young to develop their power of coordination.

It is a further object of this invention to provide a picture book whose primary appeal is in the structure thereof.

It is a further object of this invention to provide a picture book which is substantially undestructible and whose leaves are removable.

It is a further object of this invention to provide a pictorial story book with stiff removable leaves adapted to be handled by a child.

The figure is a reduced isometric view of a preferred form of the invention.

The embodiment of the invention here disclosed comprises a base member 1 of rectangular configuration formed of some suitable material, preferably a light wood such as spruce or balsa, and of sufficient thickness to lend rigidity thereto. The face 2 of this base 1 is provided with two upstanding pegs 3 and 4 with flat or rounded ends, centrally located along the opposite sides of the face. These pegs are also preferably of wood though any suitable material may be used and are fixedly mounted in suitable holes drilled in the base.

The leaves upon which the pictorial matter appear comprise a series of rectangular boards 5 of substantially the same configuration as the base 1, made of a tough, substantially rigid sheet of material, such as plywood or heavy fibre board. Each board has notches 6 and 7 formed in opposited edges at points corresponding to the pegs 3 and 4 on the base. The notches 6 and 7 are U-shaped as this design has been found most suitable for very young children. However, notches and pegs of a shape requiring more dexterity in fitting the one on the other may be used. While the base 1 and boards 5 have been shown as having square corners, they may, of course, be rounded if so desired. And while a book of rectangular configuration has been disclosed, it is within the purview of this invention to make the base and boards of a different configuration.

These boards 5 are adapted to be mounted on the base 1 in a position such that the notches 6 and 7 fit on pegs 3 and 4 whereby the former serve to retain the boards in proper position. The length of the pegs 3 and 4 is greater than the thickness of the stack of boards which permits the ends of the pegs to project a short distance above the uppermost board. These projecting ends serve as a means for grasping and lifting the toy. It will be noted that when the toy is so grasped the boards cannot fall off.

Each board carries a simplified drawing, which may be highly colored, together with simple descriptive terms thereof. Each set comprises a series of related pictures, as, for example, circus animals, and the boards and base of each of such sets may have the edges thereof painted a distinctive color to assist in the identification, arrangement and sorting thereof.

It will be seen that the rigid characteristics of both boards and base enable a child easily to pick up, carry and handle the toy. The several leaves or boards are removable by an operation which may be performed by a very young child permitting it to remove and examine one picture at a time. The pictorial matter is designed to encourage the child to investigate the following pictures in the set. This loose leaf feature of the pictorial story book, involving the removing and replacing of the boards, is designed to appeal to a child and develop its ability to coordinate thought and act. By using more complex systems of pegs and notches, or openings, the exercise of this ability may be increased.

While I have described the preferred form of my invention I do not wish to limit myself to the precise details shown but wish to avail myself of such variations and modifications as may come within the scope of the appended claims.

I claim:

1. An educational toy comprising a rigid base member, two pegs affixed to said base member, said pegs being spaced and projecting vertically from opposite edges of one face of said base member and a plurality of stacked boards adapted to rest on said base member, each of said boards comprising a relatively thin sheet of substantially rigid material adapted to have matter printed thereon, notches formed in the opposite edges of said boards and adapted loosely to receive the said pegs whereby they are retained on said base members said pegs being of greater length than the combined thickness of said boards whereby said pegs may be grasped to lift the said toy.

2. A loose leaf picture book for very young children comprising a flat rigid base member, pegs projecting vertically from one side of said member and positioned adjacent the center of two opposite edges thereof, and a plurality of flat boards carrying printed matter, said boards being notched at opposite edges, said notches loosely engaging said pegs to retain said boards on said base whereby said boards may be readily removed and replaced said pegs projecting above said boards to provide means for grasping said toy whereby loss of said boards is prevented while so grasped.

3. An educational toy comprising a base, said base consisting of a flat, rectangular, rigid member, two pegs projecting vertically from one side of said member and positioned adjacent the center of two opposite edges thereof, and a plurality of relatively thin substantially rigid boards of the same configuration as said base and adapted to carry printed matter thereon, said boards being notched at opposite edges at a position corresponding to the position of said pegs on said member to permit stacking of said boards thereon, said pegs projecting above said boards whereby said toy may be grasped to prevent loss of said boards while carrying said toy, said pegs loosely engaging said notches to retain said boards in alignment with each other and said base while permitting ready removal thereof.

PETER S. CARDOZO.